(12) United States Patent
Feret et al.

(10) Patent No.: US 9,133,348 B2
(45) Date of Patent: Sep. 15, 2015

(54) ANTISTATIC SOL/GEL COMPOSITIONS AND OPTICAL ARTICLES COATED THEREWITH

(75) Inventors: Bastien Feret, Singapore (SG); Xiaofeng Luo, Singapore (SG); Zheng Wang, Singapore (SG)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 966 days.

(21) Appl. No.: 13/266,712

(22) PCT Filed: May 7, 2010

(86) PCT No.: PCT/EP2010/056277
§ 371 (c)(1),
(2), (4) Date: Oct. 27, 2011

(87) PCT Pub. No.: WO2010/128148
PCT Pub. Date: Nov. 11, 2010

(65) Prior Publication Data
US 2012/0045577 A1    Feb. 23, 2012

(30) Foreign Application Priority Data
May 7, 2009 (EP) .................................... 09006238

(51) Int. Cl.
| | |
|---|---|
| *C09D 171/02* | (2006.01) |
| *C09D 183/12* | (2006.01) |
| *C09D 183/14* | (2006.01) |
| *C09D 5/24* | (2006.01) |
| *C08G 65/336* | (2006.01) |
| *C08G 77/58* | (2006.01) |

(52) U.S. Cl.
CPC ................ *C09D 5/24* (2013.01); *C08G 65/336* (2013.01); *C08G 77/58* (2013.01); *C09D 171/02* (2013.01); *C09D 183/12* (2013.01); *C09D 183/14* (2013.01)

(58) Field of Classification Search
CPC ...... C09D 5/24; C09D 171/02; C09D 183/12; C09D 183/14
USPC .................................. 524/779, 858; 427/162
See application file for complete search history.

(56) References Cited

U.S. PATENT DOCUMENTS 6,172,152 B1 * 1/2001 Kim et al. ..................... 524/379

FOREIGN PATENT DOCUMENTS

JP    2007-321014    12/2007

OTHER PUBLICATIONS

Lee et al., "Sol-gel preparation of organic-inorganic hybrid polymer electrolytes and their electrochemical characterizations," *Mol. Cyrst. Liq. Crypt.*, 294:229-232, 1997.

* cited by examiner

*Primary Examiner* — Kelechi Egwim
(74) *Attorney, Agent, or Firm* — Tara Clothier

(57) ABSTRACT

The invention relates to an antistatic coating composition comprising a hydrolyzate resulting from the at least partial hydrolysis of: a component A consisting of one or more compounds containing at least one polyalkylene oxide segment and at least one $—Si(X)_n$ hydrolyzable group, in which n is an integer ranging from 1 to 3 and the X groups are precursors of OH groups; at least one inorganic metal salt; and optionally, at least one component B, consisting of one or more compounds of formula $R_n,Si(Z)_{4-n'}$ or formula $R^1_{n1}Y_{m1}Si(Z^1)_{4-n1-m1}$, in which the R groups are monovalent alkyl groups, the Z and Z1 groups are hydrolyzable groups or hydrogen atoms, the $R^1$ groups are monovalent organic groups linked to the silicon atom through a carbon atom, the Y groups are monovalent organic groups linked to the silicon atom and containing at least one epoxy function, n' is an integer equal to 0, 1 or 2, m1 and n1 are integers such that m1 is equal to 1 or 2 and n1+m1=1 or 2, component A and optional component B being chosen such that a cross-linked structure is generated upon polymerization of said composition, the dry extract of said composition containing less than 5% by weight of free polyalkylene oxide polymers.

20 Claims, No Drawings

ANTISTATIC SOL/GEL COMPOSITIONS AND OPTICAL ARTICLES COATED THEREWITH

This application is a national phase application under 35 U.S.C. §371 of International Application No. PCT/EP2010/056277 filed 7 May 2010, which claims priority to European Application No. 09006238.1 filed 7 May 2009. The entire text of each of the above-referenced disclosures is specifically incorporated herein by reference without disclaimer.

BACKGROUND OF THE INVENTION

1. Field of the Invention

The present invention relates to curable sol/gel compositions for preparing transparent antistatic, impact resistant and/or abrasion resistant coatings, articles exhibiting antistatic, impact resistance and/or abrasion resistance property coated therewith, in particular optical and ophthalmic glasses for eyeglasses, and a process to prepare such articles.

2. Description of Related Art

It is well known that optical articles, which are essentially composed of insulating materials, have a tendency to get charged with static electricity, especially when they are cleaned in dry conditions by rubbing their surface with a cloth or synthetic piece, for example a polyester piece (triboelectricity). The charges which are present at the surface of said optical articles create an electrostatic field capable of attracting and fixing, as long as the charge remains on optical articles, objects lying in the vicinity thereof (a few centimeters) that have a very little weight, generally small size particles such as dusts.

In order to decrease or suppress attraction of the particles, it is necessary to decrease the intensity of the electrostatic field, i.e. to decrease the number of static charges which are present at the surface of the article. This may be carried out by imparting mobility to the charges, for instance by introducing in the optical article a layer of a material inducing a high mobility of the charges. Materials inducing the highest mobility are conductive materials. Thus, a material having a high conductivity allows for a more rapid dissipation of charges.

It is known in the art that an optical article acquires antistatic properties owing to the incorporation at the surface thereof of at least one electrically conductive layer, which is called an antistatic layer.

By "antistatic", it is meant the property of not retaining and/or developing an appreciable electrostatic charge. An article is generally considered to have acceptable antistatic properties when it does not attract or fix dust or small particles after one of its surfaces has been rubbed with an appropriate cloth. It is capable of quickly dissipating accumulated electrostatic charges.

The ability of a glass to evacuate a static charge created by rubbing it with a cloth or any other electrostatic charge generation process (charge applied by corona discharge) can be quantified by measuring the time required for said charge to be dissipated (charge decay time). Thus, antistatic glasses have a discharge time in the order of less than 500 milliseconds, and generally around 100-200 milliseconds, while static glasses have a discharge time in the order of several tens of seconds, sometimes even several minutes. A static glass having just been rubbed can thus attract surrounding dusts as long as it requires time to get discharged.

Only a limited number of materials are known in the art for preparing electrically conductive inorganic or organic layers having high optical transparency, i.e. a transmittance in the visible light of at least 90%. Known optically transparent antistatic coatings include vacuum-deposited metal or metal oxide films, for example films based on optionally doped (semi) conductive metal oxides such as tin oxide doped with indium (ITO), tin oxide doped with antimony (ATO) or vanadium pentoxyde, or spin-coated or self-assembled conductive polymer films.

ITO is the industry standard antistatic agent to provide optically transparent electrically conductive thin coatings, but the performance of ITO suffers when it is applied to plastics. These coatings are fragile and are readily damaged during bending or other stress inducing conditions. In addition, ITO layers need to be deposited by vacuum deposition in a controlled gas atmosphere.

Conductive polymers represent the most investigated alternative to ITO coatings. They are generally formed from a liquid coating composition, but still cannot match the optical and electrical performances of ITO and sometimes suffer from environmental stability problems in specific applications.

Organic-inorganic hybrid polymer electrolytes have also been proposed to form antistatic coatings.

Thus, the article entitled "Sol-gel preparation of organic-inorganic hybrid polymer electrolytes and their electrochemical characterizations" (Myong-Hoon Lee, Sung Tae Ko, Kwang Sup Lee and Suh Bong Rhee, Mol. Cryst. Liq. Crypt. 1997 Vol. 294 pp 229-232), relates to a sol/gel coating composition that includes tetraethoxysilane (TEOS), polyethylene oxide of low molecular weight (PEO, Mw=300) and an alkoxysilane bearing a polyethylene oxide group. The latter component is used as a compatibilizing agent, in order to avoid a phase separation between the "free" PEO of low molecular weight and the polysiloxane matrix. The sol/gel coating composition of the above article contains an important amount of such free PEO. The antistatic coatings made from the above disclosed composition are very easily dissolved and removed in aqueous or organic solvents, for example water and methanol. Thus, these coatings cannot be used when a further coating is to be deposited thereon through a wet coating technique, e.g. spin or dip coating. Additionally, another problem is that the originally transparent coating becomes becoming hazy.

Japanese patent application No 2007-321014 discloses a composition for forming a polyurethane based antistatic layer which comprises a resin A which is a polymeric component having an active hydrogen group (typically a polyvinyl alcohol polymer), a resin B which is an ion conductive polymer, a supporting electrolytic salt and a polyisocyanate. The ion conductive polymer of resin B contains a hydrophilic segment, a polysiloxane segment and an active hydrogen group. The hydrophilic segments can be PEO segments. The content of the polysiloxane segments shall not exceed 30% by weight of the whole resin, otherwise the resulting antistatic film becomes slippery. This composition is specifically designed to provide a coating having a polyurethane matrix.

It is still desirable to produce new antistatic sol/gel compositions which result in antistatic coatings that do not impair the optical and mechanical properties of the coated optical article.

In particular, the new antistatic compositions shall provide antistatic coatings capable of being themselves coated through a wet coating technique with additional coatings such as an abrasion-resistant and/or scratch resistant coating, while keeping their excellent antistatic properties.

A further goal of the invention is to provide such antistatic compositions for forming antistatic and optionally abrasion and/or scratch-resistant layers that provide both good adhesion to an optical substrate and/or an additional functional coating formed thereon, and at the same time preserve the optical and mechanical properties of the obtained optical article, for example an ophthalmic lens; (said properties including high transmittance, low haze, good abrasion/scratch resistance, good impact resistance and other additional properties such as antireflection, anti-smudge, anti-fogging, etc.).

Further, soft plastic substrates such as plastic lenses are generally made of soft polymer materials and are easily scratched especially when the lenses are cleaned using a cloth and especially when there are dust deposited on the surfaces. Thus, an abrasion and/or scratch resistant coating is usually needed for plastic lenses or other soft substrates.

Accordingly, another objective is to provide an antistatic, abrasion and/or scratch-resistant composition for forming an antistatic and anti-abrasion coating.

Also, an aim of the invention is to provide antistatic compositions as above which result in antistatic coatings having a polysiloxane matrix rather than a polyurethane matrix for improved compatibility with classic abrasion resistant coatings which are mostly polysiloxane based coatings.

SUMMARY OF THE INVENTION

The present inventors have found that the above goals are achieved by formulating an antistatic coating forming sol/gel composition comprising:

(a) a hydrolyzate resulting from the at least partial hydrolysis of a component A consisting of one or more polymerizable compounds containing at least one polyalkylene oxide segment and at least one, preferably at least two —Si(X)$_n$ hydrolyzable groups, each —Si(X)$_n$ being a precursor of a silanol group formed during hydrolysis (i.e. the X groups independently represent precursors of OH groups), in which n is an integer from 1 to 3, preferably 3;

(b) optionally, a component B consisting of one or more compounds of formula

$$R_n Si(Z)_{4-n'} \qquad (I)$$

or a hydrolyzate thereof, in which the R groups, identical or different, represent monovalent alkyl groups, the Z groups, identical or different, represent hydrolyzable groups or hydrogen atoms, and n' is an integer equal to 0, 1 or 2, preferably 0, with the proviso that the Z groups do not all represent an hydrogen atom when n'=0, and preferably do not all represent a hydrogen atom, and/or a compound of formula

$$R^1_{n1} Y_{m1} Si(Z^1)_{4-n1-m1} \qquad (II)$$

or a hydrolyzate thereof, in which the R$^1$ groups, identical or different, represent monovalent organic groups linked to the silicon atom through a carbon atom, the Y groups, identical or different, represent monovalent organic groups linked to the silicon atom and containing at least one epoxy function, the Z$^1$ groups are identical or different, represent hydrolyzable groups or hydrogen atoms, m1 and n1 are integers such that m1 is equal to 1 or 2 and n1+m1=1 or 2; and (c) at least one inorganic metal salt;

and component A and optional component B being chosen such that a crosslinked structure is generated upon polymerization of said composition, the dry extract of said composition containing less than 5% by weight, preferably less than 2% by weight, more preferably less than 1% by weight, better less than 0.5% by weight of dry extract of free polyalkylene oxide (PEO) polymers, and preferably being totally devoid of any free polyalkylene oxide polymer.

By "free PEO" it is meant herein a PEO that is not chemically linked to an inorganic matrix such as a polysiloxane matrix. The free PEO polymers do not have any functional group capable of reacting with the crosslinked structure upon polymerization of the composition of the invention so as to establish a chemical link with the matrix.

On the contrary, polymerizable compounds of component A which have Si(X)$_n$ hydrolyzable groups are not free PEO as they react to be chemically linked to the crosslinked structure generated upon polymerization of the composition.

By <<dry extract>>, it is meant herein solid matters that remain after evaporation of the solvents, preferably under vacuum up to 100° C.

The dry extract and the dry extract weight of a component in a composition can also be theoretically calculated as explained hereunder.

The present invention also concerns a process of forming a stack of at least two coatings on an optical substrate comprising the steps of:

(1) depositing on a main face of the substrate a layer of an antistatic composition as defined above;

(2) at least partially curing the deposited layer of antistatic composition; and (3) depositing on the at least partially cured layer of step (2) a layer of another coating forming composition.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF THE INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

When an optical article comprises one or more surface coatings, the phrase "to deposit a coating or layer onto the optical article" means that a coating or layer is deposited onto the outermost coating of the optical article, i.e. the coating which is the closest to the air.

A coating that is "on" a side of a lens is defined as a coating that (a) is positioned over that side, (b) need not be in contact with that side, i.e., one or more intervening coatings may be disposed between that side and the coating in question, and (c) need not cover that side completely.

"Sol/gel" methods and compositions are known by the person skilled in the art.

Sol/gel coating preparation involve precursors forming polymers by hydrolysis and condensation at relatively low temperatures (typically from 20° C. to 150° C.), different from a calcination at high temperature (typically 300° C.-500° C.).

The optical article prepared according to the present invention is a transparent optical article, preferably a lens or lens blank, and more preferably an ophthalmic lens or lens blank. The optical article may be coated on its convex main face (front side), concave main face (back side), or both faces with the antistatic coating according to the invention.

Herein, the term "lens" means an organic or inorganic glass lens, comprising a lens substrate which may be coated with one or more coatings of various natures.

The lens substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis(allylcarbonate) polymers and copolymers (in particular CR-39® from PPG Industries), thermosetting polyurethanes, polythiourethanes, polyepoxides, polyepisulfides, poly(meth)acrylates and copolymers based substrates, such as substrates comprising (meth)acrylic polymers and copolymers derived from bisphenol-A, polythio(meth)acrylates, as well as copolymers thereof and blends thereof. Preferred materials for the lens substrate are polycarbonates (PC) and diethylene glycol bis(allylcarbonate) polymers, in particular substrates made of polycarbonate.

The optical article comprising a substrate used herein may also be a carrier onto which the antistatic coating is stored. It can be transferred later from the carrier onto the substrate of e.g. an optical lens.

The surface of the article onto which the transparent antistatic coating will be applied may optionally be subjected to a pre-treatment step intended to improve adhesion, for example a high-frequency discharge plasma treatment, a glow discharge plasma treatment, a corona treatment, an electron beam treatment, an ion beam treatment, an acid or base treatment.

The antistatic coating according to the invention may be deposited onto a naked substrate or onto the outermost coating layer of the substrate if the substrate is coated with at least one surface coating. Said at least one surface coating may be, without limitation, an impact-resistant coating (impact resistant primer), an abrasion and/or scratch resistant coating, a polarized coating, a photochromic coating or a dyed coating.

The impact-resistant coating which may be used in the present invention can be any coating typically used for improving impact resistance of a finished optical article. This coating generally enhances adhesion of the abrasion and/or scratch-resistant coating on the substrate of the finished optical article. By definition, an impact-resistant primer coating is a coating which improves the impact resistance of the finished optical article as compared with the same optical article but without the impact-resistant primer coating.

Typical impact-resistance primer coatings are (meth)acrylic based coatings and polyurethane based coatings, in particular coatings made from a latex composition such as a poly(meth)acrylic latex, a polyurethane latex or a polyester latex.

Their thickness generally ranges from 0.5 to 2 microns, preferably around 1 micron.

The abrasion- and/or scratch-resistant coating which may be used in the present invention can be any coating typically used for improving abrasion- and/or scratch-resistance of a finished optical article as compared to a same optical article but without the abrasion- and/or scratch-resistant coating.

The abrasion and/or scratch resistant coating composition, which upon curing, leads to the abrasion and/or resistant coating generally comprises solvents such as alcoholic solvent, for example methanol, ethanol, propanol, or ketonic solvents or other kind of solvents that may affect the integrity of the coating on which it is applied, if this latter coating is not sufficiently cured or not crosslinked and/or comprises species not covalently linked.

Preferred abrasion- and/or scratch-resistant coatings are (meth)acrylate based coatings and silicon-containing coatings. The latter are more preferred and are disclosed, for example, in French patent application FR 2702486, which is incorporated herein by reference.

The thickness of the abrasion resistant coating generally ranges from 1 micron to 10 microns, preferably from 2 to 6 microns, more preferably from 3 to 5 microns.

The inventive curable coating composition applied onto the substrate provides, upon curing, a functional transparent coating having antistatic properties and also preferably impact resistance. It will also be referred to in this patent application as the "antistatic composition".

The antistatic coating composition may be a solution or dispersion, both terms being merged in the present patent application. These terms refer to a mixture of components which generally is uniform at the macroscopic scale (visually) and are not related to a particular solubility state or particle size of said components.

A main constituent of the antistatic sol/gel composition of the invention, which provides antistatic properties, is a hydrolyzate resulting from the hydrolysis of component A which consists of at least one or more compounds containing at least one polyalkylene oxide segment, preferably at least one polyethylene oxide segment and at least two —Si(X)$_n$ hydrolyzable groups, in which n is a integer from 1 to 3, preferably equal to 3. As already mentioned each —Si(X)$_n$ hydrolyzable group is a precursor of a silanol group.

Preferably, the compounds constituting component A comprise at least one —Si(X)$_n$, preferably one SiX$_3$, hydrolyzable group at one terminal position of the compound molecule.

More preferably, the compounds constituting component A comprise two —Si(X)$_n$, preferably two SiX$_3$, hydrolyzable groups, each at one terminal position of said compound.

X may be a H atom or any atom or radical that upon hydrolysis leads to a hydroxyl group, such as a halogen, in particular Cl, or an OR' group in which R' is an alkyl radical, preferably a C$_1$-C$_4$ alkyl radical, in particular CH$_3$ or C$_2$H$_5$.

A preferred class of compounds of component A are compounds of formula:

$$(R^2O)_3SiR^3(CH_2CH_2O)_xR^4 \quad (III)$$

in which:

R$^2$, identical or different, is an alkyl group, preferably a C$_1$-C$_4$ alkyl group, in particular CH$_3$ or O$_2$H$_5$, R$^3$ is a divalent radical, preferably a —(CH$_2$)$_{x1}$— or a —(CH$_2$)$_{x2}$—NHC(O)— radical, in which x1 and x2 are integers from 1 to 4, preferably from 1 to 3, R$^4$ is H, an alkyl group, preferably a C$_1$-C$_4$ alkyl group, in particular CH$_3$ or O$_2$H$_5$, a R$^5$—C(O)— group in which R$^5$ is an alkyl radical, preferably a C$_1$-C$_4$ alkyl radical, or a —R$^3$Si(OR$^2$)$_3$ group in which R$^2$ and R$^3$ are defined as above, and, x is an integer from 3 to 50, preferably from 5 to 35, more preferably from 9 to 35. Best optical quality of the antistatic coating is obtained for x ranging from 20 to 30. Examples of commercial compounds of formula (III) are:

Bis[N,N'-(triethoxysilyl propyl)aminocarbonyl]polyethylene oxide (9EO);
Bis[triethoxysilyl propyl]polyethylene oxide (25-30EO);
Bis[(3-methyldimethoxy silyl) propyl]propylene oxide;
2-(methoxy(polyethylene oxy) propyl)trimethoxy silane;
2-(acetoxy(polyethylene oxy) propyl)triethoxy silane;
2 (methoxy(polyethylene oxy) propyl trimethoxy silane;
N-(triethoxy silyl propyl)-o-polyethylene oxide urethane.
Methoxy(polyethyleneoxy)propyltrimethoxysilane.

Most of these compounds may be obtained from Gelest Inc.

The theoretical dry extract of component A generally represents 5% by weight to 95% by weight, preferably 10 to 95% by weight based on the weight of the theoretical dry extract of the coating composition.

When the antistatic coating composition is an impact resistant coating composition, component A generally represents 30% to 95% by weight based on the weight of the theoretical dry extract of the coating composition.

When the antistatic coating composition is an abrasion resistant coating composition, component A generally represents from 5 to 30% by weight, more preferably from 10 to 30% by weight based on the weight of the theoretical dry extract of the coating composition.

Preferably, the compounds constituting component A have a molecular weight <2000 g/mol, more preferably ranging from 400 to 600 g/mol.

As indicated previously, the one or more compounds of optional component B can be a compound of formula:

$$R_n Si(Z)_{4-n'} \quad (I)$$

or a hydrolyzate thereof, in which the R groups, identical or different, represent monovalent alkyl groups, the Z groups, identical or different, represent hydrolyzable groups or hydrogen atoms, and n' is an integer equal to 0, 1 or 2, preferably 0, with the proviso that the Z groups do not all represent a hydrogen atom when n'=0, and preferably do not all represent a hydrogen atom.

Silanes of formula (I) bear two to four Z groups directly linked to the silicon atom, each leading to an OH group upon hydrolysis and one or two monovalent organic R groups linked to the silicon atom. It is worth noting that SiOH bonds may be initially present in the compounds of formula (I), which are considered in this case as hydrolyzates. Hydrolyzates also encompass siloxane salts.

The Z groups may represent hydrolyzable groups independently chosen from the hydrolyzable groups which have been previously cited when describing the X groups. Preferably, the Z groups are hydrolyzable groups which are identical or different.

The most preferred R groups are $C_1$-$C_4$ alkyl groups, such as methyl, ethyl, n-propyl, i-propyl, n-butyl, i-butyl, preferably methyl groups.

Most preferred compounds of formula (I) are those having formula $Si(Z)_4$. Examples of such compounds are tetraalkoxysilanes such as tetraethoxysilane $Si(OC_2H_5)_4$ (TEOS), tetramethoxysilane $Si(OCH_3)_4$ (TMOS), tetra(n-propoxy)silane, tetra(i-propoxy)silane, tetra(n-butoxy)silane, tetra(sec-butoxy)silane or tetra(t-butoxy)silane, preferably TEOS.

Compounds of formula (I) may also be chosen from alkylalkoxysilanes, including compounds of formula $RSi(Z)_3$, for example alkyltrialkoxysilanes such as methyl triethoxysilane (MTEOS), or compounds of formula $R_2Si(Z)_2$, for example dialkyldialkoxysilanes such as dimethyldiethoxysilane.

The optional compound B can also be at least one compound of formula:

$$R^1{}_{n1} Y_{m1} Si(Z^1)_{4-n1-m1} \quad (II)$$

or a hydrolyzate thereof, in which the $R^1$ groups, identical or different, represent monovalent organic groups linked to the silicon atom through a carbon atom, the Y groups, identical or different, represent monovalent organic groups linked to the silicon atom through a carbon atom and containing at least one epoxy function, the $Z^1$ groups are identical or different and represent hydrolyzable groups or hydrogen atoms, m1 and n1 are integers such that m1 is equal to 1 or 2 and n1+m1=1 or 2.

The $Z^1$ groups may independently and without limitation represent H, alkoxy groups —O—$R^6$, wherein $R^6$ preferably represents a linear or branched alkyl or alkoxyalkyl group, preferably a $C_1$-$C_4$ alkyl group, an acyloxy groups —O—C(O)$R^7$, wherein $R^7$ preferably represents an alkyl group, typically a $C_1$-$C_6$ alkyl group, and more preferably a methyl or ethyl group, a halogen group such as Cl and Br, an amino group optionally substituted with one or two functional groups such as an alkyl or silane group, for example the $NHSiMe_3$ group, an alkylenoxy group such as the isopropenoxy group, a trialkylsiloxy group, for example the trimethylsiloxy group.

The $Z^1$ groups are preferably alkoxy groups, in particular methoxy, ethoxy, propoxy or butoxy, more preferably methoxy or ethoxy. In this case, compounds of formula (II) are alkoxysilanes.

The integers n1 and m1 define three groups of compounds (II): compounds of formula $R_1YSi(X)^1{}_2$, compounds of formula $Y_2Si(X)^1{}_2$, and compounds of formula $YSi(Z^1)_3$. Among these compounds, epoxysilanes having the formula $YSi(Z^1)_3$ are preferred.

The monovalent $R^1$ groups linked to the silicon atom through a Si—C bond are organic groups. These groups may be, without limitation, hydrocarbon groups, either saturated or unsaturated, preferably $C_1$-$C_{10}$ groups and better $C_1$-$C_4$ groups, for example an alkyl group, preferably a $C_1$-$C_4$ alkyl group such as methyl or ethyl, an aminoalkyl group, an alkenyl group, such as a vinyl group, a $C_6$-$C_{10}$ aryl group, for example an optionally substituted phenyl group, in particular a phenyl group substituted with one or more $C_1$-$C_4$ alkyl groups, a benzyl group, a (meth)acryloxyalkyl group, or a fluorinated or perfluorinated group corresponding to the above cited hydrocarbon groups, for example a fluoroalkyl or perfluoroalkyl group, or a (poly)fluoro or perfluoro alkoxy [(poly)alkyloxy]alkyl group.

The most preferred $R^1$ groups are alkyl groups, in particular $C_1$-$C_4$ alkyl groups, and ideally methyl groups.

The monovalent Y groups linked to the silicon atom through a Si—C bond are organic groups since they contain at least one epoxy function, preferably one epoxy function. By epoxy function, it is meant a group of atoms, in which an oxygen atom is directly linked to two adjacent carbon atoms or non adjacent carbon atoms comprised in a carbon containing chain or a cyclic carbon containing system. Among epoxy functions, oxirane functions are preferred, i.e. saturated three-membered cyclic ether groups.

Epoxysilanes compounds of formula (II) provide a highly cross-linked matrix. The preferred epoxysilanes have an organic link between the Si atom and the epoxy function that provides a certain level of flexibility.

The preferred Y groups are groups of formulae (IV) and (V)

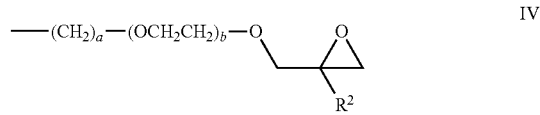

-continued

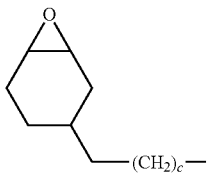

in which $R^2$ is an alkyl group, preferably a methyl group, or a hydrogen atom, ideally a hydrogen atom, a and c are integers ranging from 1 to 6, and b is 0, 1 or 2.

The preferred group having formula (IV) is the γ-glycidoxypropyl group ($R^2$=H, a=3, b=0) and the preferred (3,4-epoxycyclohexyl)alkyl group of formula (V) is the β-(3,4-epoxycyclohexyl)ethyl group (c=1). The γ-glycidoxyethoxypropyl group may also be employed ($R^2$=H, a=3, b=1).

Preferred epoxysilanes of formula (II) are epoxyalkoxysilanes, and most preferred are those having one Y group and three alkoxy $Z^1$ groups. Particularly preferred epoxytrialkoxysilanes are those of formulae (VI) and (VII):

$(R^1O)_3Si(CH_2)_a$—$(OCH_2CH_2)_b$—O⟨▱⟩     VI

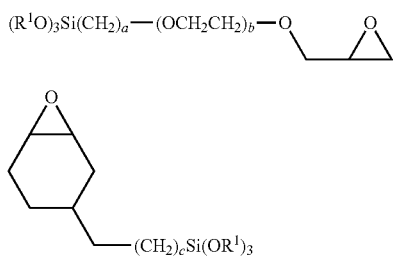    VII in which $R^1$ is an alkyl group having 1 to 6 carbon atoms, preferably a methyl or ethyl group, and a, b and c are such as defined above.

Examples of such epoxysilanes include but are not limited to glycidoxy methyl trimethoxysilane, glycidoxy methyl triethoxysilane, glycidoxy methyl tripropoxysilane, α-glycidoxy ethyl trimethoxysilane, α-glycidoxy ethyl triethoxysilane, β-glycidoxy ethyl trimethoxysilane, β-glycidoxy ethyl triethoxysilane, β-glycidoxy ethyl tripropoxysilane, α-glycidoxy propyl trimethoxysilane, α-glycidoxy propyl triethoxysilane, α-glycidoxy propyl tripropoxysilane, β-glycidoxy propyl trimethoxysilane, β-glycidoxy propyl triethoxysilane, β-glycidoxy propyl tripropoxysilane, γ-glycidoxy propyl trimethoxysilane, γ-glycidoxy propyl triethoxysilane, γ-glycidoxy propyl tripropoxysilane, 2-(3,4-epoxycyclohexyl)ethyltrimethoxysilane, 2-(3,4-epoxycyclohexyl)ethyltriethoxysilane. Other useful epoxytrialkoxysilanes are described in U.S. Pat. No. 4,294,950, U.S. Pat. No. 4,211,823, U.S. Pat. No. 5,015,523, EP 0614957 and WO 94/10230, which are hereby incorporated by reference. Among those silanes, γ-glycidoxypropyltrimethoxysilane (GLYMO) is preferred.

Preferred epoxysilanes of formula (II) having one Y group and two $Z^1$ groups include, but are not limited to, epoxydialkoxysilanes such as γ-glycidoxypropyl-methyl-dimethoxysilane, γ-glycidoxypropyl bis(trimethylsiloxy)methylsilane, γ-glycidoxypropyl-methyl-diethoxysilane, γ-glycidoxypropyl-methyl-diisopropenoxysilane, and γ-glycidoxyethoxypropyl-methyl-dimethoxysilane. When epoxy dialkoxysilanes are used, they are preferably combined with epoxytrialkoxysilanes such as those described above, and are preferably employed in lower amounts than said epoxytrialkoxysilanes.

The above optimal compounds act as cross-linking agents of the compounds of component A. Silanes present in the curable antistatic composition may be hydrolyzed partially or totally, preferably totally. Hydrolyzates can be prepared in a known manner, e.g., as disclosed in FR 2702486 and U.S. Pat. No. 4,211,823. Hydrolysis catalysts such as hydrochloric acid or acetic acid may be used to promote the hydrolysis reaction over the condensation reaction. The hydrolysis may be total or partial.

In one embodiment, a stoichiometric amount of water is added, i.e., the molar amount of added water corresponds with the molar amount of hydrolysable groups.

In another embodiment, a lower amount of water than necessary for a stoichiometric hydrolysis is added. The polycondensation of silanol groups leading to Si—O—Si units releases additional water in the composition that also promotes acts for hydrolysis.

Component A and optional component B are chosen such that the antistatic sol/gel forming coating composition leads to a cross-linked structure upon polymerization.

If component A consists in a compound having only one $Si(X)_n$ group and wherein n=1, at least one component B is necessarily present in the coating composition and is preferably chosen from components B of formula I wherein n'=0, and components B of formula II wherein $m_1+n_1=1$ (i.e. $n_1=0$).

If component A consists in a compound having only one $Si(X)_n$ group wherein n=2, or only two $Si(X)_n$ groups wherein n=1, at least one component B is necessarily present in the coating composition and is preferably chosen from components B of formula I wherein n'=0 or 1, and components B of formula II, wherein n1+m1=1 or 2, preferably 1.

If component A consists of in a compound having only 3 Si—X bonds, especially one $Si(X)_3$ group, component A is able to cross-link by itself. However, it has been found that it is preferable to add at least a small amount of component B in order to modify the properties, for example in order to improve solvent resistance. Typically, only around 2 to 3% of dry extract of component B consists of a compound of formula II, wherein $m_1=1$ and $n_1=0$, or consists of consisting in a compound of formula I, wherein n'=0 is able to increase solvent resistance.

When Glymo is used as the cross-linking agent, the ratio of Glymo/component A (component A having only one $Si(X)_3$ group ranges typically from 4/100 to 300/100.

The theoretical dry extract of optional component B typically ranges from 0% to 60% by weight based on the theoretical dry extract of the composition.

When component B is present, the antistatic composition according to the invention may exhibit abrasion and/or scratch resistance properties, especially when organic or inorganic nanoparticles are included in said composition.

The organic or inorganic nanoparticles that can be present in the antistatic composition generally increase the hardness and/or the refractive index of the cured coating, and also generally prevent any possible diffusion of the layer just deposited onto the antistatic coating.

Although inorganic nanoparticles are preferably used, and in particular nanoparticles of metal oxides, metalloid oxides, nitrides or fluorides, a mixture of organic and inorganic nanoparticles may also be used.

Examples of nanoparticles that are suitably used in the invention include nanoparticles of the following compounds: $SiO_2$, $Al_2O_3$, $ZrO_2$, $TiO_2$, $Sb_2O_5$, $Ta_2O_5$, $ZnO_2$, $SnO_2$, indium oxide, $Ce_2O_3$, $WO_3$, $Y_2O_3$, $BaTiO_3$, and mixtures thereof.

Nanoparticles are preferably used in a colloidal form, that is to say in the form of fine particles, in which the diameter (or the longest side) is lower than 1 μm, preferably lower than 150 nm, more preferably lower than 100 nm, even more preferably ranging from 10 to 80 nm, and are dispersed in a dispersing medium, such as water, alcohols, ketones, esters and mixtures thereof, preferably alcohols.

When present, organic or inorganic nanoparticles are present in the antistatic composition in an amount preferably ranging from 5% to 40%, more preferably from 5 to 30%, even better from 10 to 20% by weight based on the total weight of the curable antistatic composition.

Nanoparticles may also be composite particles, preferably composite particle colloids, having more preferably a core/shell structure, for example, based on the following oxides: $SiO_2/TiO_2$, $SiO_2/ZrO_2$, $SiO_2/TiO_2/ZrO_2$, $TiO_2/SiO_2/ZrO_2/SnO_2$. Such composite particle colloids are available from the Catalysts and Chemical Company.

Particularly recommended composite particles are described in EP 730168, JP 11310755, JP 200204301 and JP 2002363442.

The inorganic metal salt (also called ionic salt) of the present invention can be any salt classically used for forming solid electrolytes. These salts are disclosed for example in the article previously mentioned and JP2007321014. Preferred salts are ionic salts of formula $M^+A^-$; wherein $M^+$ is selected from $Li^+$, $Na^+$ and $K^+$, and the anion $A^-$ is selected from $ClO_4^-$, $BF_4^-$, $PF_6^-$, $CF_3SO_3^-$, $CF_3CO_2^-$, $CF_3SO_2^-$, $(CF_3SO_2)_2N^-$ and $(C_2F_5SO_2)_2N^-$. The most preferred salts are the lithium salts and in particular $Li^+CF_3SO_3^-$.

Typically, the amount of ionic salt in the antistatic coating composition ranges from 5 to 25% by weight based on the theoretical dry extract of the composition The molar ratio [M+]/[alkylene oxide unit] preferably ranges from, 0.01 to 0.15, preferably from 0.03 to 0.13.

Generally the polysiloxane part of the coating represents 75% to 95% by weight of the total weight of the dry coating. The weight of polysiloxane part is the theoretical dry extract of all precursors of the polysiloxane part, including components A and B.

The antistatic composition generally comprises a catalytic amount of at least one curing catalyst such as acetylacetonate metal salts, in particular aluminum acetylacetonate $Al(Ac Ac)_3$, a hydrolyzate thereof or carboxylates of metals such as zinc, titanium, zirconium, tin or magnesium. Condensation catalysts such as saturated or unsaturated polyfunctional acids or acid anhydrides may also be used, in particular maleic acid, itaconic acid, trimellitic acid or trimellitic anhydride. Numerous examples of curing and/or condensation catalysts are given in "Chemistry and Technology of the Epoxy Resins", B. Ellis (Ed.) Chapman Hall, New York, 1993 and "Epoxy Resins Chemistry and Technology" $2^{eme}$ edition, C. A. May (Ed.), Marcel Dekker, New York, 1988.

In general, the catalysts described above are used according to the invention in an amount ranging from 0.01 to 10%, preferably from 0.1 to 5% by weight based on the total weight of the curable antistatic composition. The antistatic coating composition comprises at least one solvent, preferably a polar solvent, like water, an alcohol, or mixtures thereof, preferably an alcohol, e.g. methanol, ethanol, n-propanol, isopropanol, n-butanol, isobutanol, sec-butanol, tert-butanol, n-amylic alcohol, isoamylic alcohol, sec-amylic alcohol, tert-amylic alcohol, 1-ethyl-1-propanol, 2-methyl-1-butanol, 1-methoxy-2-propanol n-hexanol, cyclohexanol, ethyl cellosolve (monoethoxy ethylene glycol), and ethylene glycol.

It is also possible to add an appropriate amount of another organic solvent in said composition such as NMP, acetone, tetrahydrofuran, DMSO, DMAc, triethylamine or DMF without being limited to this solvent list. However, the antistatic coating composition preferably only comprises environmentally benign solvents, such as water and/or $C_1$-$C_4$ alcohols.

The solvent or mixture of solvents may represent from 50 to 99% by weight, relative to the weight of the coating composition, preferably from 50 to 90%, more preferably from 60 to 90%.

The antistatic coating composition may also comprise at least one non ionic or ionic surfactant, i.e. anionic, cationic or amphoteric surfactant, to improve the wettability of the coating solution or the optical quality of the deposit. A particularly preferred class of surfactants comprises fluorinated surfactants, preferably anionic fluorinated surfactants.

Fluorinated surfactants are known and described generally in "Fluorinated Surfactants" by E. Kissa, Surfactants Science Series, Vol. 50 (Marcel Dekker, New York 1994). Fluorinated surfactants include perfluoroalkanoic acids and salts thereof, in particular perfluorooctanoic acids and salts thereof, such as ammonium perfluorooctanoic acid, fluorinated polyethers or perfluoropolyether surfactants, such as disclosed in EP 1059342, EP 712882, EP 752432, EP 816397, U.S. Pat. No. 6,025,307, U.S. Pat. No. 6,103,843 and U.S. Pat. No. 6,126,849. Further fluorinated surfactants are disclosed in U.S. Pat. No. 5,229,480, U.S. Pat. No. 5,763,552, U.S. Pat. No. 5,688,884, U.S. Pat. No. 5,700,859, U.S. Pat. No. 5,804,650, U.S. Pat. No. 5,895,799, WO 00/22002 and WO 00/71590. Fluorinated polyethers derived from hexafluoropropyleneoxide have been described in US Publication No. 2005/096244. Another class of fluorinated surfactants includes fluorocarbon modified polysiloxane surfactants, e.g., polyalkyleneoxide-modified heptamethyltrisiloxane allyloxypolyethylene glycol surfactant.

The surfactant or mixture of surfactants may represent from 0.001% to 5% by weight, relative to the weight of the coating composition, preferably from 0.02 to 1%, more preferably from 0.05 to 0.5%, even better from 0.05 to 0.3%, and optimally 0.05 to 0.2%.

The antistatic composition may also contain various additives conventionally used in polymerizable compositions, in conventional proportions. These additives include stabilizers such as antioxidants, UV light absorbers, light stabilizers, anti-yellowing agents, adhesion promoters, dyes, photochromic agents, pigments, rheology modifiers, lubricants, cross-linking agents, photo-initiators, fragrances, deodorants and pH regulators. They should neither decrease the effectiveness of the antistatic agent nor deteriorate optical properties of the article.

The antistatic coating composition according to the invention generally has a theoretical dry extract weight which represents less than 50% of the total weight of the composition, and preferably ranging from 0.2 to 30%, even better from 0.2 to 20%, which includes both required compounds (antistatic agent, binder) and optional compounds.

By "theoretical dry extract weight of a component in a composition," it is meant the theoretical weight of solid matter of this component in said composition. The theoretical dry extract weight of a composition is defined as the sum of the theoretical dry extract weights of each of its components. As used herein, the theoretical dry extract weight of compounds of formula I, II or III is the calculated weight in $R_n Si(O)_{(4-n)/2}$ units, $R^1_{n1} Y_{m1} Si(O)_{(4-n1-m1)/2}$ and the calculated weight of units from component A, wherein $-Si(X)n$ is replaced by $-SiO_{n/2}$.

For other components, different from solvents, and which do not undergo chemical transformation, their theoretical dry extract is their own weight.

The inventive antistatic coating is formed at the surface of an optical article by liquid phase deposition or lamination according to any appropriate method, starting from the above described liquid antistatic coating composition. Application of said composition may be carried out, without limitation, by spin coating, dip coating, spray coating, brush coating, roller coating. Spin coating and dip coating are preferred.

After application of the antistatic coating composition onto the surface of the optical article, the composition may be dried or cured, if necessary, according to any appropriate method, for example, drying with air, in an oven or by using a drier, so as to provide a conductive transparent film. Generally, a temperature of 50-130° C., preferably 70° C. to 120° C. is employed. A higher temperature and/or a longer drying/curing step sometimes improves abrasion resistance of the antistatic coating to the underlying coating or article.

Thickness of the antistatic coating in the final optical article preferably ranges from 5 to 5000 nm, more preferably from 5 to 3000 nm, even more preferably from 50 to 2000 nm.

The antistatic coating can also be tinted by wet dip tinting method of other dry tinting method (e.g. dye vacuum sublimation), and thus bring color and shade to the transparent substrate.

The antistatic coating of the invention also has an improved ability to be tinted by ink jet printing, especially by using a water-based ink and provides a good resolution and no visible ink beading issue.

The present coating composition can be used in the ophthalmic lens industry to prepare antistatic lenses, but also for general antistatic purpose in the field of photographic films, electronics or food packaging and imaging materials. Particular non limiting uses include electromagnetic windows, optically transparent conductors for display devices and electromagnetic radiation shielding.

Its advantages are numerous and include applicability to most of substrates with good adhesion, in particular plastic substrates, and for the production of optical articles having high transmittance, low haze, high scratch/abrasion resistance, high electrical conductivity, excellent antistatic properties, providing compatibility with coatings, such as primer coatings and antireflection coatings, while maintaining excellent adhesion to other coatings, such as primer coatings.

The present invention provides optical articles having charge decay times ≤500 milliseconds, preferably ≤200 milliseconds, more preferably ≤150 milliseconds and better ≤100 milliseconds, when coated on one main face with the above described antistatic coating or the two main faces of the optical article.

The final optical articles (when being non-tinted) preferably do not absorb light in the visible range (or only little light), which means herein that when coated on one side with the inventive antistatic coating, the optical article has a luminous absorption in the visible range due to the antistatic coating of preferably 1% or less, more preferably less than 1%, and/or a relative light transmission factor in the visible spectrum, Tv, preferably higher than 90%, more preferably higher than 91%, and even more preferably higher than 91.5%. Preferably, both features are simultaneously satisfied and can be reached by carefully controlling thicknesses of the coatings and the content of conductive polymers. As used herein, a "transparent" optical article is an optical article having a Tv higher than 90%, more preferably higher than 91%, and even more preferably higher than 91.5%. The Tv factor is such as defined in the standard NF EN 1836 and corresponds to transmission in the 380-780 nm wavelength range.

In an alternative embodiment, the optical article may be tinted or dyed and absorb light in the visible range.

The final optical articles prepared according to the invention preferably have low haze characteristics. Haze is a measurement of the transmitted light scattered more than 2.5° from the axis of the incident light. The smaller the haze value, the lower the degree of cloudiness. The haze value of the present optical articles is preferably less than 0.8%, more preferably less than 0.5%, even better less than 0.4 and ideally less than 0.25%.

The invention also relates to a process for preparing a transparent, antistatic and abrasion- and/or scratch-resistant optical article, comprising:
  providing an optical article comprising a substrate having at least one main face,
  applying onto at least part of said at least one main face of the substrate an antistatic composition such as described previously, and at least partly curing said composition, and
  applying another coating composition directly onto said at least partly cured antistatic composition.

The present optical articles can be processed simply and at low temperature (≤100° C.), using environment friendly solvents (alcohol or water/alcohol co-solvent). The present process is flexible and allows incorporation of other functional coatings onto the substrate.

Preferably, said other coating composition directly applied on the antistatic coating is an abrasion and/or scratch resistant coating.

The antistatic coating of the invention can be deposited on a main face of a naked substrate, for example a substrate already coated with an abrasion and/or scratch resistant coating or an impact resistant coating or both. Preferred coating stacks are: substrate/impact resistant coating/antistatic coating/abrasion and/or scratch resistant coating, substrate/antistatic coating/impact resistant coating/abrasion and/or scratch resistant coating, substrate/antistatic coating/abrasion and/or scratch resistant coating and substrate/impact resistant coating/antistatic and abrasion/scratch-resistant coating.

Indeed, further classical coatings such as an anti-reflective coating and/or an antifouling coating can be deposited on the above coating stacks.

Now, the present invention will be described in more detail with reference to the following examples. These examples are provided only for illustrating the present invention and should not be construed as limiting the scope and spirit of the present invention.

EXAMPLES

1. Testing Methods

The following test procedures were used to evaluate the optical articles prepared according to the present invention. Three samples for each system were prepared for measurements and the reported data were calculated in the average of three data.

a) Charge Decay Time

In the present patent application, charge decay times of optical articles which have been beforehand subjected to a corona discharge at 9000 volts were measured using JCI 155v5 Charge Decay Test Unit from John Chubb Instrumentation at 25.4° C. and 30% or 50% relative humidity.

The unit was set up with JCI 176 Charge Measuring Sample Support, JCI 191 Controlled Humidity Test Chamber, JCI 192 Dry Air Supply Unit, and Calibration of voltage sensitivity and decay time measurement performance of JCI 155 used to the methods specified in British Standard and Calibration voltage measurements, and resistor and capacitor values traceable to National Standards.

b) Dry and Wet Adhesion Test (Crosshatch Test)

Dry adhesion of the transferred coatings was measured using the cross-hatch adhesion test according to ASTM D3359-93, by cutting through the coatings with a series of 5 lines, spaced 1 mm apart with a razor, followed by a second series of 5 lines, spaced 1 mm apart, at right angles to the first series, forming a crosshatch pattern comprising 25 squares. After blowing off the crosshatch pattern with an air stream to remove any dust formed during scribing, clear cellophane tape (3M SCOTCH® No, 600) was then applied over the crosshatch pattern, pressed down firmly, and then rapidly pulled away from the coating in a direction perpendicular to the coating surface. Application and removal of fresh tape was then repeated two additional times. Adhesion was is rated as follows: 0 was the best adhesion, 1-4 was in the middle, and 5 was the poorest adhesion.

TABLE 1

| Adhesion score | Squares removed | Area % left intact |
|---|---|---|
| 0 | 0 | 100 |
| 1 | <1 | >96 |
| 2 | 1 to 4 | 96-84 |
| 3 | >4 to 9 | 83-64 |
| 4 | >9 to 16 | 63-36 |
| 5 | >16 | <36 |

Wet adhesion test was performed similar to the dry adhesion but after the coated lens had been placed for 30 minutes in boiling water.

c) Determination of the Abrasion Resistance ("ISTM Bayer Test" or "Bayer Alumina")

The Bayer abrasion test is a standard test used to determine the abrasion resistance of curved/lens surfaces. Determination of the Bayer value was performed in accordance with the ASTM F735-81 (Standard Test Method for Abrasion Resistance of Transparent Plastics and Coatings Using Oscillating Sand Method), except that the sand was is replaced by alumina.

Per this test, a coated lens and an uncoated lens (reference lens of similar curvature, diameter, thickness and diopter) were subjected to an oscillating abrasive box (using approximately 500 g of aluminum oxide ZF 152412 supplied by Specialty Ceramic Grains, former Norton Materials) for 300 cycles of abrasion in 2 minutes.

The haze (H) of both the reference and coated samples were then measured with a Haze Guard Plus meter, in accordance with ASTM D1003-00, before and after the test has been performed. The results were expressed as a calculated ratio of the reference lens to the coated lens (Bayer value=$H_{standard}/H_{sample}$). The Bayer value is a measure of the performance of the coating, with a higher value meaning a higher abrasion resistance.

d) Scratch-Resistance: Hand Steel Wool Test (HSW)

The HSW test was implemented on the convex side of the lens only. Waiting There was a waiting time of 24 hours before performing the test when an antireflection coating was deposited on the lens.

The lens was manually abraded with a steel wool in a direction perpendicular to fibers by performing 5 back and forth motions (with an amplitude from 4 to 5 cm) keeping constant pressure on the steel wool with an index finger. Strength pressed on the steel wool can be evaluated with a balance by fixing the lens on the balance plate with adhesive tape and pressing down on the lens with the index finger, exercising normal strength on the lens. This strength is about 5 Kg during the first way (motion) and about 2.5 Kg during the return way (motion). Lenses were visually inspected and noted according to the following table, in which the higher the note, the more abraded is the lens.

| Number of scratches | >50 | 11-50 | ≤10 |
|---|---|---|---|
| Note | 5 | 3 | 1 |
| Risk level | High | Acceptable | Low | e) Haze Value, Tv and Thickness.

The haze value of the final optical article was measured by light transmission utilizing the Haze-Guard Plus haze meter from BYK-Gardner (a color difference meter) according to the method of ASTM D1003-00, which is incorporated herein in its entirety by reference. All references to "haze" values in this application are by this standard. The instrument was first calibrated according to the manufacturer's directions. Next, the sample was placed on the transmission light beam of the pre-calibrated meter and the haze value was recorded from three different specimen locations and averaged. Tv was measured using the same device.

Thickness of the films was evaluated by ellipsometer (thickness <1 µm) equipped with M44™, EC-270 and LPS-400 with 75 W Xenon Light Source from J. A. Woollam Co. Inc. or with a Metricon Model 2010 Prism Coupler apparatus (thickness >1 µm) from Metricon Corporation.

f) UV Aging:

UV aging was determined during the dry adhesion test after subjecting the coated lenses to a sun test of 200 hours.
Suntest apparatus: Atlas CPS+; light intensity: 60+/−6 klux; chamber temperature: 23+/−5 C.

g) Impact Resistance:

The impact resistance was has been measured according to the FDA standard for ophthalmic glasses. This test consists of in dropping a ball of 16 g from a height of 127 cm onto the center of the convex face of the lens, which corresponds to an energy of 200 mJ. The glass successfully passed the test when the glass was neither broken nor presented star-shaped cracks.

2. Experimental Details a) Antistatic Compositions for Examples 1-4

Antistatic solutions as described in table 1 (ingredients in wt %) below were prepared as follows:

The silylated PEO was is first hydrolyzed with 0.1 N hydrochloric acid (added dropwise) during 45 minutes, then catalyst, surfactant and lithium salt were added. The mixture was is stirred for 2 hours and filtered.

TABLE I

| Ingredients | Composition No. 1 | Composition No. 2 |
|---|---|---|
| Methanol | 71.6 | 69.1 |
| Bis [(triethoxysilylpropyl) aminocarbonyl] polyethylene oxide (PEO) | 24 | — |
| Bis (triethoxysilylpropyl) polyethylene oxide (25-30EO) | — | 23.3 |
| HCl 0.1N | 1.4 | 1.7 |
| Lithium trifluoro methane sulfonate | 2.5 | 4.3 |
| Aluminium acetylacetonate | 0.4 | 0.6 |
| FC-4430 surfactant | 0.1 | — |
| EFKA-3034 surfactant | — | 0.1 | b) Antistatic, Abrasion-Resistant Compositions for Examples 5-9

Antistatic hard coating solutions as described in table II below (ingredients in wt %) were prepared by mixing the antistatic ingredients into an abrasion resistant coating formulation.

Firstly, abrasion resistant coating solution was prepared. GLYMO was hydrolyzed by adding 0.1 N HCl into a beaker of GLYMO, dropwise with a dropping funnel. During mixing, temperature of the mixture should be controlled to 25-40° C. Then DMDES (dimethyldiethoxysilane) was added in dropwise (funnel). After completion, the mixture was kept stirring for 16-20 hr at room temperature for complete hydrolysis. The $SiO_2$ colloid (MAST from Nissan chemical America INC, 30% solid content) was introduced into the mixture, which was stirred for about 10 min. Aluminium acetylacetonate, FC4430 and MEK were added and stirring was continued for 10 min.

Secondly, antistatic ingredients were prepared. The sylated PEO was first hydrolyzed with 0.1 N hydrochloric acid (added dropwise) at 25° C. for 24 hours, then lithium salt was added. The mixture was stirred for 2 hours.

Thirdly, antistatic abrasion resistant coating solution was prepared by mixing the antistatic ingredients into the abrasion resistant coating solution in a designated ratio. The solution was filtered (3 μm filter) and kept at 4° C. for storage.

TABLE II

| Ingredients/Example | 5 | 6 | 7 | 8 | 9 |
|---|---|---|---|---|---|
| 0.1N HCl | 5.7 | 5.5 | 5.2 | 5.0 | 4.8 |
| Methyl ethyl ketone (MEK) | 3 | 2.8 | 2.7 | 2.5 | 2.3 |
| Methanol | 13.4 | 16.3 | 19.4 | 22.5 | 25.8 |
| SIB-1824.84 | 4.2 | 5.1 | 6.1 | 7.1 | 8.1 |
| Glymo | 15.1 | 14.4 | 13.6 | 12.8 | 11.9 |
| Dimethyldiethoxysilane | 7.9 | 7.5 | 7.1 | 6.7 | 6.2 |
| Lithium trifluoro methane sulfonate | 0.8 | 1 | 1.1 | 1.3 | 1.5 |
| Aluminium acetylacetonate | 1 | 0.9 | 0.9 | 0.8 | 0.8 |
| FC-4430 ® surfactant | 0.1 | 0.1 | 0.1 | 0.1 | 0.1 |
| $SiO_2$ colloid (30% wt) | 48.9 | 46.4 | 43.9 | 41.2 | 38.5 |

SIB-1824.84 is Bis (triethoxysilylpropyl) polyethylene oxide (25-30 EO)

c) Abrasion-Resistant Coating Composition for Examples 1-4

The abrasion-resistant coating composition comprised by weight 224 parts of GLYMO (glycidoxypropyltrimethoxysilane), 80.5 parts of HCl 0.1N, 120 parts of DMDES (dimethyldiethoxysilane), 718 parts of a 30% weight % colloidal silica in methanol, 15 parts of aluminium acetylacetonate and 44 parts of ethylcellosolve. The composition also comprises 0.1% of the Fluorad® FC-430 (3M Company, Minnesota, USA) by weight as related to the total weight of the composition. Such a composition was is disclosed in example 3 of EP 0614954.

d) Optical Substrates

The optical substrates used in the examples were round ORMA® lenses (−0.75 dioptries with a diameter of 68 mm and a center thickness from 2 to 2.5 mm) obtained by polymerizing diethylene glycol bis(allyl carbonate) (known as CR-39®) monomer composition.

Example 1

The antistatic composition No. 1 was deposited on both faces of an ORMA® lens by dip coating and was cured at 75° C. for 30 minutes to form a layer of 1 to 2 μm thickness.

Then an abrasion-resistant layer of 2.5 to 3.5 μm was formed by dip coating on both sides of the lens on top of the antistatic layer, followed by pre-curing at 75° C. for 12 minutes and curing cured at 105° for 3 hours.

Properties of the resulting coated lens are given in table III below.

TABLE III

| Testing | Method and condition | Value |
|---|---|---|
| Charge decay time (ms) | JCI, humidity 30% at 25° C. | 100~200 |
|  | JCI, humidity 30% at 25° C. | 100~200 |
| Transmittance | Cary-50 UV-Visible | >92.0% |
| Light absorption | SMR and Cary-50 UV-Visible | <0.1% |
| Haze | Haze-Guard | <0.1 |
| Adhesion of anti-static hard coat | Dry cross hatch | 0 |
| Abrasion resistance | ISTM Bayer test (Bayer Alumina) | >5 |
| UV aging | Sun test 200 hrs (Dry cross hatch) | 0 |
| Shock resistance | FDA impact resistance test | pass |

Examples 2 to 4

ORMA® lens substrates were coated as follows:
The lenses were coated by dip coating successively with an antistatic composition No. 1 and an abrasion-resistant coating as defined above. The only difference in examples 2 to 4 was the thickness of the antistatic coating.

The resulting products were submitted to the FDA impact test, modified by increasing the height of dropping to break the lens. The results are given in Table IV.

TABLE IV

| Example n° | Thickness of antistatic coating (μm) | Drop Ball test Average energy (mJ) at break (30 samples) |
|---|---|---|
| 2 | 1.1 | 701 |
| 3 | 1.3 | 775 |
| 4 | 1.9 | 877 |

The obtained values of energies at break were are far higher than the FDA value of 200 mJ that a lens has to pass according to the FDA drop ball (impact) test.

Comparative examples CE1 and CE2

The comparative experiments used a PEO/$Li^+$ electrolyte (the PEO has no reactive groups).
1) PEO/$Li^+$ electrolyte was added in the abrasion resistant coating composition of example 3 of EP614957.
Mechanical performances of the lens were not good due to the high amount of PEO necessary to achieve antistatic coating. When dipped in a hard coat, at least part of the PEO was eluted in the subsequent hard coat solution.
2) PEO/Li+ electrolyte was added in a latex W234™ primer solution.
The obtained composition exhibits a low stability and there was formation of precipitate.

Examples 5 to 9

ORMA® lens substrates were first coated with a primer layer (W234™ latex from Baxenden) by dip or spin coating and then cured at 75° C. for 15 min. Then, the antistatic abrasion resistant coating was deposited onto said primer by dip or spin coating, cured at 75° C. for 30 min and post-cured at 105° C. for 2 hours. A layer of about 2~3 μm of thickness was obtained.

Properties of the resulting coated lenses are given in table V below.

TABLE V

| Example | Charge decay time (ms) JCI, humidity 50% at 25° C. | Transmittance Cary-50 UV-Visible | Haze Haze-Guard | Adhesion of anti-static hard coat | | Abrasion resistance ISTM-Bayer |
|---|---|---|---|---|---|---|
| | | | | Dry cross hatch | Wet cross hatch | |
| 5 | 100~200 | 92.8 | <0.1 | 0 | 0 | 4.08 |
| 6 | 50~120 | 92.8 | <0.1 | 0 | 0 | 2.90 |
| 7 | <70 | 92.8 | <0.1 | 0 | 0 | 2.46 |
| 8 | <60 | 92.8 | <0.1 | 0 | 0 | 2.15 |
| 9 | <60 | 92.8 | <0.1 | 0 | 0 | 1.95 |

Example 10

The antistatic composition No. 2 (with the bis(triethoxysilylpropyl) polyethylene oxide and lithium trifluoromethanesulfonate) which is a methanol based solution was prepared. The solution was spin-coated onto an optical film (e.g., NOF) by means of a Laurell spin-coater. Then, the film was cured in an oven at 105° C. for 2 hours. Upon completion of curing and cooling to ambient temperature, this film could be printed by an inkjet printer.

Printing images used can be picture files (jpeg, bmp, png, etc) downloaded or edited by photo-editing softwares readily available. Typically using small size logo images of sizes within lens diameter (55-80 mm).

The NOF film printed on the coating of the invention exhibits acceptable print quality, viewed by the naked eye, good resolution and no visible beading issue.

The NOF film without the coating of the invention had poor printing quality, with an ink beading phenomenon. Even after 1 hour, the image was well maintained.

The antistatic property remained remains after printing, as depicted shown in the (Table VI).

TABLE VI

| Thickness | 1.5~2.0 μm |
|---|---|
| Refractive Index | ~1.45 |
| Charge decay time | CX/CC <200 ms |

The invention claimed is:

1. An antistatic sol/gel forming coating composition comprising:
   (a) a hydrolyzate resulting from at least partial hydrolysis of a component A consisting of one or more compounds containing at least one polyalkylene oxide segment and at least two —Si(X)$_n$ hydrolyzable groups in which n is an integer ranging from 1 to 3, and the X groups independently are precursors of OH groups;
   (b) optionally, at least one component B consisting of: one or more compounds of formula:

$R_n Si(Z)_{4-n'}$ (I)

or a hydrolyzate thereof, in which the R groups independently are monovalent alkyl groups, the Z groups independently are hydrolyzable groups or hydrogen atoms, and n' is an integer equal to 0, 1 or 2, such that the Z groups do not all represent a hydrogen atom when n'=0; with or without one or more compounds of the formula:

$R^1_{n1} Y_{m1} Si(Z^1)_{4-n1-m1}$ (II)

or a hydrolyzate thereof, in which the R1 groups independently are monovalent organic groups linked to the silicon atom through a carbon atom, the Y groups independently are monovalent organic groups linked to the silicon atom and containing at least one epoxy function, the Z1 groups independently are hydrolyzable groups or hydrogen atoms and m1 and n1 are integers such that m1 is equal to 1 or 2 and n1+m1=1 or 2; and
   (c) at least one inorganic metal salt;
   wherein component A and optional component B generate a cross-linked structure upon polymerization of the composition, the dry extract of the composition containing less than 5% by weight free polyalkylene oxide polymers.

2. The composition of claim 1, wherein component A is further defined as containing at least two polyalkylene oxide segments.

3. The composition of claim 2, wherein component A is further defined as containing two polyalkylene oxide segments.

4. The composition of claim 1, wherein n' is 0.

5. The composition of claim 1, wherein the dry extract of the composition is less than 2% by weight free polyalkylene oxide polymers.

6. The composition of claim 5, wherein the dry extract of the composition is devoid of free polyalkylene oxide polymers.

7. The composition of claim 1, wherein the one or more compounds of component A comprise at least one —Si(X)$_n$ hydrolyzable group at one terminal position of the compound.

8. The composition of claim 7, wherein the —Si(X)$_n$ hydrolyzable group is a —SiX$_3$ group.

9. The composition of claim 1, wherein the one or more compounds of component A comprise two —Si(X)$_n$ hydrolyzable groups one at each terminal position of the compound.

10. The composition of claim 9, wherein the —Si(X)n hydrolysable groups are —SiX$_3$ groups.

11. The composition of claim 1, wherein the X groups independently are H, a halogen atom, or a OR' group, in which R' is an alkyl radical.

12. The composition of claim 1, wherein component A comprises one or more compounds of formula III:

$(R^2O)_3 SiR_3 (CH_2CH_2O)_x R^4$ (III)

wherein:
R$^2$ independently is an alkyl group;
R$^3$ is a divalent radical;
R$^4$ is H, an alkyl radical, a R$^5$C(O)— group in which R$^5$ is an alkyl radical, or a —R$^3$Si(OR$_2$)$^3$ group; and
x is an integer ranging from 3 to 50.

13. The composition of claim 12, wherein R$^3$ is a —(CH$_2$)$_{x1}$— or a —(CH$_2$)$_{x2}$—NHC(O)— radical in which x1 is an integer from 1 to 4 and x2 is an integer from 1 to 4.

14. The composition of claim 12, wherein x is an integer ranging from 9 to 35.

15. The composition of claim 1, wherein the one or more compound of component B is an alkoxysilane, alkylalkoxysilane, epoxysilane, or epoxyalkoxysilane.

16. The composition of claim 1, wherein the inorganic metal salt is an alkaline metal salt.

17. The composition of claim 1, wherein the theoretical dry extract of component A represents 30 to 95% by weight based on the weight of the theoretical dry extract of the composition.

18. The composition of claim 1, wherein component B represents 0 to 60% by weight based on the theoretical dry extract of the composition.

19. The composition of claim 1, wherein the inorganic metal salt represents 5 to 25% by weight based on the theoretical dry extract of the composition.

20. The composition of claim 1, wherein the amount of polysiloxane represents 75-95% by weight based on the weight of theoretical dry extract of the composition.

* * * * *